Dec. 22, 1953

P. F. PEW 2,663,591

FILTER SURFACE WASH NOZZLE

Filed April 7, 1951

INVENTOR.
Preston F. Pew
BY
AGENT

Patented Dec. 22, 1953

2,663,591

UNITED STATES PATENT OFFICE 2,663,591

FILTER SURFACE WASH NOZZLE

Preston F. Pew, Tucson, Ariz., assignor to Infilco Incorporated, Tucson, Ariz., a corporation of Delaware Application April 7, 1951, Serial No. 219,876

3 Claims. (Cl. 299—141)

This invention relates to filter surface wash systems and more particularly to an improved spray nozzle for such a system.

It is an object of this invention to provide a precision nozzle for a filter surface wash system which can be manufactured economically.

Another object is to provide a nozzle construction for the purpose mentioned which reduces the loss of head through the nozzle as compared with nozzles heretofore used.

Another object is to provide a nozzle which can be exactly and economically reproduced any number of times.

Other objects of the invention will become apparent upon consideration of the detailed description and the claims which follow.

In filter surface wash systems it is usual to mount above the filter bed a system of stationary or movable pipes provided with spray nozzles through which jets of water are discharged downwardly onto the filter bed to agitate the surface layer of the filter bed. Heretofore little attention has been paid to the structure of the nozzles used in such surface wash systems. They have usually been made from standard brass pipe cap or other similarly shaped casting, with a suitable number of machined orifices distributed in the pipe cap. I have discovered that to obtain uniform washing of the entire filter surface by such a surface wash system it is of great importance that the direction and strength of the water jets be uniform through all nozzles. In large filter plants there may be a thousand or more nozzles used. It is practically impossible to so machine a large number of nozzles as to obtain orifices which are correct and uniform in placement, direction and length. Consequently, there has been considerable variation in the direction of the jets and the loss of pressure through the nozzles, and the agitation of the filter surface was not uniform.

Further, it is very desirable to obtain a streamlined discharge to avoid unnecessary splashing of the jets and to reduce the loss of pressure through the nozzle.

I have found that the inequalities of the nozzles heretofore used can be overcome by using a molded nozzle, preferably of plastic material. This permits reproducing the exact dimensions, directions and placements of the orifices in any number of nozzles, without machining or otherwise working on individual nozzles. One suitable plastic material is that sold by the Dow Chemical Co. under the trade-name "Saran." However, molding, per se, is not a cure-all. To reduce the loss of head through the nozzle I use a streamlined shape, which can be readily molded but could be machined only with prohibitively high cost.

The invention will be more readily understood by reference to the drawing which forms a part hereof, and wherein.

Figure 1:
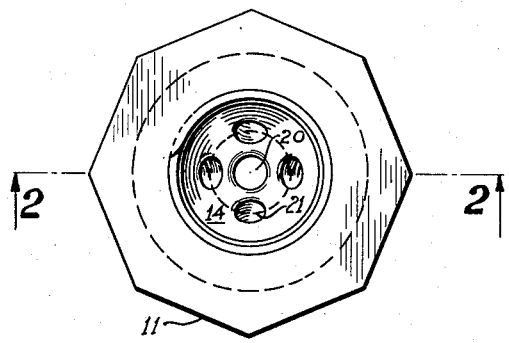
Figure 1 is a plan view of a nozzle according to the invention.
Figure 2:
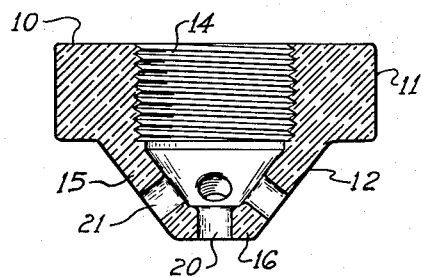
Figure 2 is a sectional view along line 2—2 of Figure 1.
Figure 3:
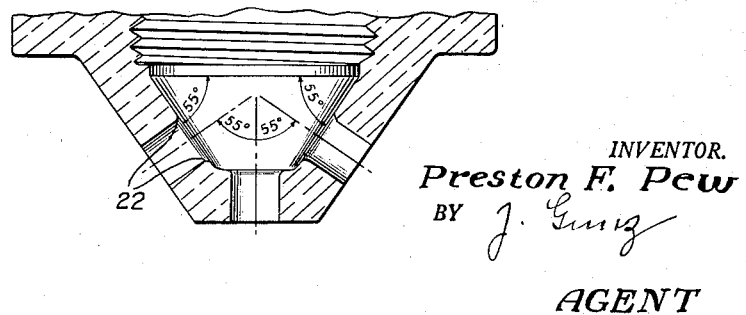
Figure 3 is a partial sectional view similar to Figure 2, but on an enlarged scale, showing the inclination of the orifices to each other.

The nozzle 10 has a shank portion 11 and integral therewith a spray head 12. The shank portion 11 may be hexagonal or octagonal, as shown, to permit the use of standard tools when removing the nozzle from, or fastening it to, its pipe. The shank portion has a cylindrical bore 14 which is threaded, preferably with American standard pipe thread so that it can be used with any standard pipe system. The spray head has an inverted frusto-conical side wall 15 and at its discharge end an end wall 16, which is parallel to the base of the conical side wall. In the preferred form of the nozzle, shown in Figures 2 and 3, the side wall 15 slopes at an angle of 52° to its horizontal base. While the slope of the side wall 15 is not strictly critical, and small deviations are permissible it should be about 52°.

An orifice 20 is provided in the end wall and is aligned with the center line of the bore 14. Four equally spaced orifices 21 extend through the lower part of the side wall 15 at right angles thereto. As clearly shown in Figure 3, this arrangement provides equal angles of about 52° between the center line through the orifice 20 and the center lines through each of the orifices 21. The inlet edges of the orifices 20 and 21 are rounded, as shown at 22 in Figure 3, to reduce friction through the orifices. The inner surfaces of the walls 15 and 16 must be perfectly smooth. The plastic materials I contemplate for my nozzle are particularly well adapted to provide these smooth surfaces in economical manner.

I have found in comparative tests between a standard machined pipe cap nozzle and a plastic nozzle shaped as described, that the discharge through each orifice of the nozzle according to the invention is exact and uniform as to quantity and direction, a result not attained with the machined pipe cap nozzle. Furthermore, the loss of pressure through the orifices of my precision nozzle was considerably reduced.

It will be understood that the nozzle need not be of plastic and can be molded of other material, although I have found plastic most suitable and economical, and that small modifications of the structure shown and described can be made without deviating from the spirit and scope of the invention. Accordingly, I do not wish to limit myself to the exact details shown herein for purposes of illustration but not of limitation.

I claim:

1. A precision spray nozzle for a filter surface wash system comprising a molded body having a shank portion with a cylindrical bore and a hollow spray head integral with said shank portion and free of internal structure, said spray head having an inverted frusto-conical side wall and an end wall, and five orifices extending through said walls, the slope of said side wall to its base being about 52°, one of said orifices extending through said end wall aligned with the center line of said cylindrical bore, and four equally spaced orifices extending through the lower portion of said side wall and at right angles to said side wall, the angles between the center line of said first orifice and the center line of each of said four orifices being equal, each being about 52°, each of said orifices having rounded edges at its inlet end.

2. A precision spray nozzle for a filter surface wash system comprising a plastic molded body having an octagonal shank portion with a cylindrical threaded bore and a hollow spray head integral with said shank portion and free of internal structure, said spray head having an inverted frusto-conical side wall and an end wall, and five orifices, one of said orifices extending through said end wall aligned with the center line of said cylindrical bore, and the other four orifices being equally spaced and extending through the lower portion of said side wall and at right angles to said side wall, each of said orifices having rounded edges at its inlet end, the angle between the center line of said first orifice and the center line of each of said four other orifices being 52°.

3. A precision spray nozzle for a filter surface wash system comprising a unitary molded plastic body having a shank portion with a cylindrical bore and downwardly and inwardly inclined wall means forming a spray head, said spray head being free of internal structure obstructing flow and having five symmetrically arranged orifices, each of said orifices extending at right angles through said wall means and having rounded edges at the inlet end, one of said orifices being axially aligned with the center line of said bore, and the other four orifices being uniformly angularly displaced with regard to said first orifice, the angle between the center line of said first orifice and the center line of each of said four orifices being 52°.

PRESTON F. PEW.

References Cited in the file of this patent

UNITED STATES PATENTS

| Number | Name | Date |
|---|---|---|
| 331,782 | Ferguson | Dec. 8, 1885 |
| 1,062,714 | Johnston | May 27, 1913 |
| 1,401,462 | Circle | Dec. 27, 1921 |
| 1,631,007 | Bucknam | May 31, 1927 |
| 1,809,787 | McLaren | June 9, 1931 |
| 2,395,227 | Lewis et al. | Feb. 19, 1946 |
| 2,493,719 | Gorabedian | Jan. 3, 1950 |
| 2,567,642 | Henshaw | Sept. 11, 1951 |

FOREIGN PATENTS

| Number | Country | Date |
|---|---|---|
| 29,562/30 | Australia | July 23, 1931 |